United States Patent [19]

Eggers et al.

[11] Patent Number: 4,530,037
[45] Date of Patent: Jul. 16, 1985

[54] FLASH TUBE WITH MOVING REFLECTORS

[75] Inventors: Frederick W. Eggers, Palos Heights; Leslie J. Jezuit, Burr Ridge, both of Ill.

[73] Assignee: Federal Signal Corporation, Oak Brook, Ill.

[21] Appl. No.: 503,496

[22] Filed: Jun. 13, 1983

[51] Int. Cl.³ .............................................. F21V 21/30
[52] U.S. Cl. ................................... 362/35; 362/170; 362/241; 362/263; 362/269; 362/298; 340/81 R; 340/331
[58] Field of Search .............. 362/61, 80, 269, 234, 362/241, 35, 170, 298; 340/77, 81 R, 84, 331

[56] References Cited

U.S. PATENT DOCUMENTS

| 4,104,614 | 8/1978 | Litman | 362/35 |
| 4,127,844 | 11/1978 | Purdy | 340/81 R |
| 4,205,366 | 5/1980 | Bleiweiss | 340/84 |
| 4,357,595 | 11/1982 | Grosswiller | 340/81 R |
| 4,387,362 | 6/1983 | Grosswiller | 340/84 |

Primary Examiner—Donald P. Walsh
Attorney, Agent, or Firm—Charles F. Pigott, Jr.

[57] ABSTRACT

A warning assembly for emergency vehicles comprising a flash lamp assembly and a non-synchronous moving reflector assembly. The flash tube is subjected to a relatively rapid flash rate in conjunction with the movable reflectors attaining a scattering of the high intensity light throughout a desired area with high optical gain.

10 Claims, 3 Drawing Figures

FLASH TUBE WITH MOVING REFLECTORS

BACKGROUND OF THE INVENTION

This invention relates in general to warning systems for emergency vehicles and, in particular, to improved warning systems employing a flash tube.

More specifically, but without restriction to the particular use which is shown and described, this invention relates to a light assembly having a flash tube, commonly known as a strobe light, used with a moving reflector for use in warning systems for emergency vehicles. The assembly of the invention is capable of scattering high intensity flashes of light over an enlarged area and attaining high optical gain.

It is common in the prior art to use a visually steady burning incandescent light in conjunction with moving reflectors to create high intensity flashes of light. The incandescent element generally provides a relatively small light source and operates favorably with the high optical gain provided by reflectors. Because of the steady nature of the light of an incandescent filament, the reflector can effectively be swept over limited arcs of rotation or oscillations, or through circles of 360° to scatter the light over a greater area.

A strobe light, on the other hand, is a high intensity light device employing a gas filled tube capable of generating a flash intensity significantly greater than an incandescent bulb. Flash tube sources have been used in the prior art to create brief, high intensity flashes of light not requiring a moving reflector, since the flash tube creates its own flash. The light generated by a strobe device is generally broader in width than a incandescent bulb, since the light source is in the form of a tube. It has been known in the prior art to provide a 360° strobe light by using it in combination with a stationary 360° fresnel lens, although the efficiency of such systems is relatively low, being in the area of an optical gain of 5.

Flash lamp assemblies used in warning systems of emergency vehicles in the prior art have conventionally used a fixed reflector with a stationary strobe light. The reason that strobe lights have not been used previously with movable reflector systems is because of the nature of a gas discharge device. The flash tube is not continuous and provides a high intensity flash for a very brief time interval, after which the light is off. It has been undesirable to use a flashing strobe with a moving reflector, because the broad beam of the tube with its brief flash of high intensity would result in sections of an area being swept through movement of the reflector to be missed. This would result in areas in which observers would not see a visual flash, rendering the use of flash tubes with high gain moving reflectors inappropriate in situations, such as in emergency conditions.

SUMMARY OF THE INVENTION

It is, therefore, an object of this invention to provide an improved method and light assembly for warning systems of an emergency vehicle.

Another object of this invention is to provide a flash tube assembly used with at least one moving reflector.

A further object of this invention is to pulse a flash tube at a relatively rapid rate in conjunction with a moving reflector system to effectively scatter high intensity light throughout a desired area.

Still another object of this invention is to combine the optical advantages of a moving reflector with the high intensity flash created by a flash tube device.

These and other objects are attained in accordance with the present invention wherein there is provided a flash tube assembly having a high total efficiency by being used with a moving reflector in a warning system for emergency vehicles. The unique arrangement of the invention combines the high luminous efficiency of a gas discharge source with a moving reflector system having high optical gain and the ability to cover a wide area. The flash tube of the invention is pulsed at a relatively rapid rate with respect to a moving, non-synchronous mirror. Because of the broad beam of the gas discharge device, the rapidly pulsed source insures a scattering of light to be visible in generally the complete area being swept by the reflector system.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein.

Figure 1:
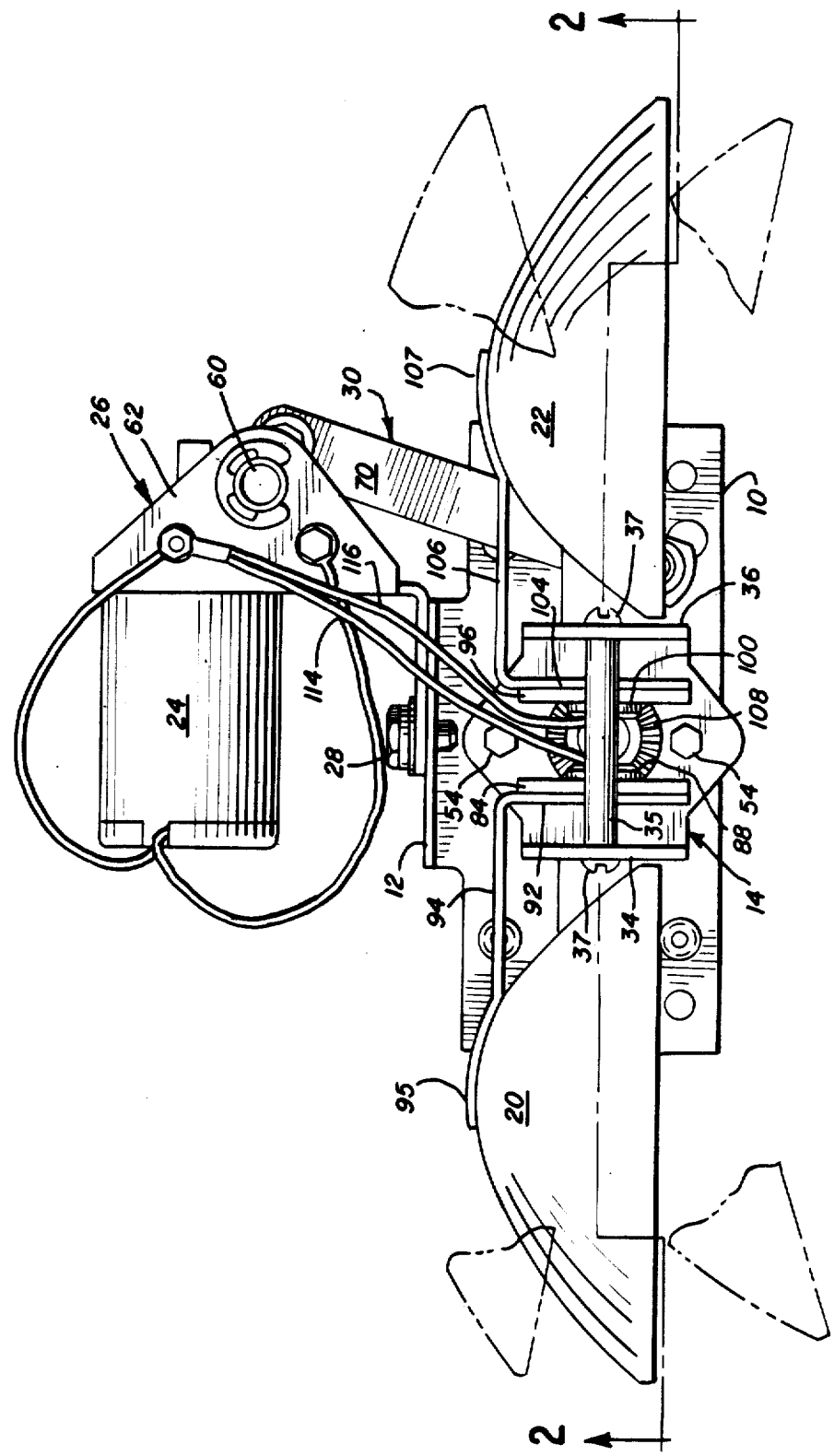
FIG. 1 is a top plan view of a flash tube assembly, with moving reflector, constructed in accordance with the present invention, showing by means of dash lines different horizontal positions of two light reflectors.

Now, in order to acquaint those skilled in the art with the manner of making and using my invention, I shall describe, in conjunction with the accompanying drawings, a preferred embodiment of the invention.

DESCRIPTION OF A PREFERRED EMBODIMENT

Referring now to the drawings, there is shown a light assembly including a base plate 10 having an integral upright backplate portion 12, and a U-shaped bracket 14 which pivots about a vertical axis and carries a pair of light sources comprising flash tubes 16 and 18 and reflectors 20 and 22.

In the following description, the flash lamp assembly with moving reflectors of the invention is described in conjunction with a specific light assembly capable of moving a pair of reflectors through horizontal angles of ±20° and through vertical angles of approximately ±15°. The particular structure of the reflectors and its oscillating system herein described, except for it being directed to the dissimilar environment employing an incandescent light source and the like, is described in co-pending patent application Ser. No. 426,990, filed Sept. 29, 1982, for Twin Oscillating Light by Edward S. Stanuch, which is incorporated herein by reference for purposes of illustrating suitable moving reflectors and socket mounting for the strobe lights.

Figure 2:
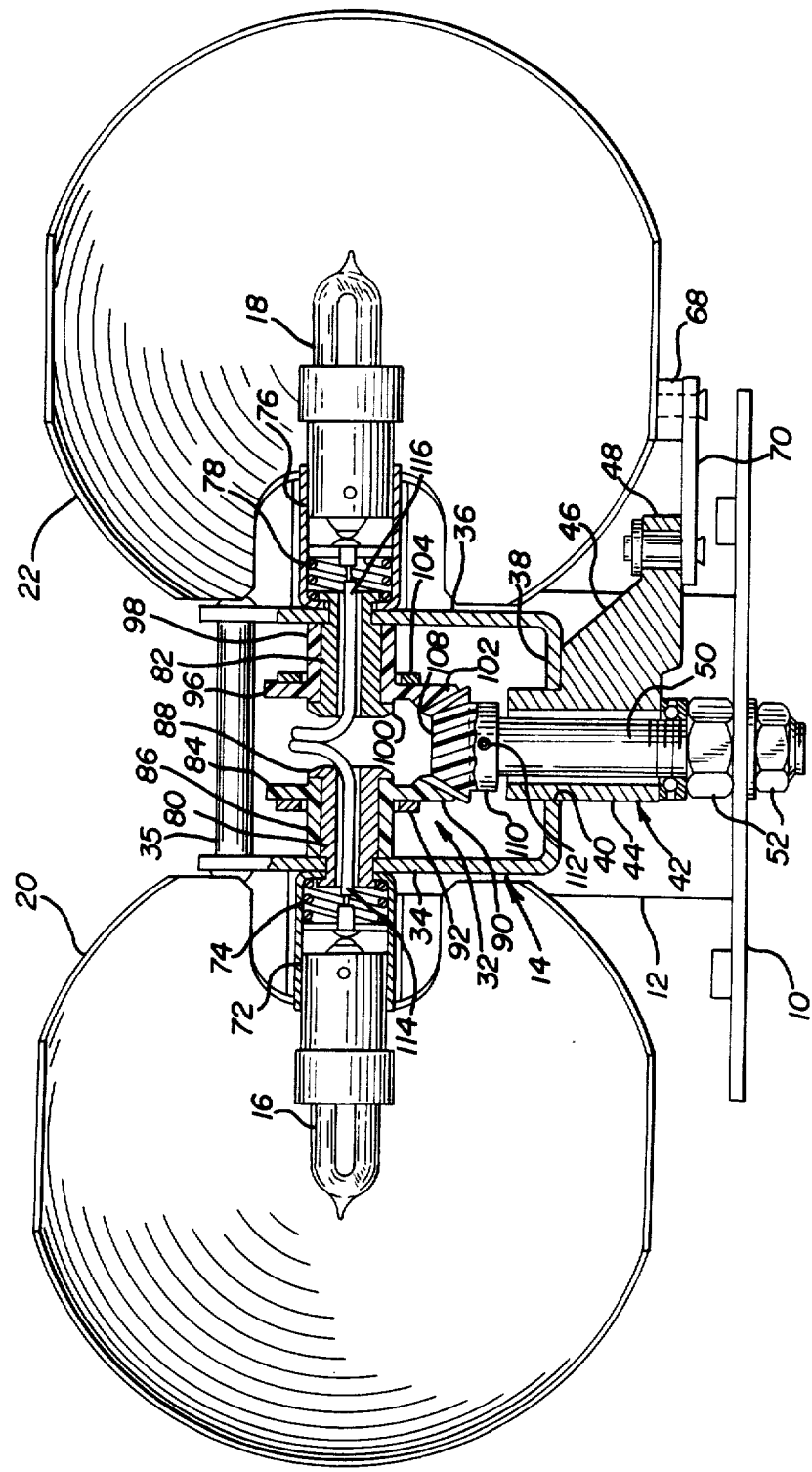
FIG. 2 is a vertical sectional view taken substantially along the lines 2—2 of FIG. 1.

The invention of the application is directed to using a flash tube source in conjunction with any suitable non-synchronous oscillating or rotating reflector system, such as the light assembly described in said co-pending application. It is within the scope of the invention, however, to use flash tubes 16 and 18 as shown in FIG. 2 herein with other moving reflectors to attain the objectives of the invention. The technique described herein combines the advantages of high optical gain and the scattering of light provided by one or more movable reflectors with the high light intensity inherent in using one or more stationary flash tubes, such that flashes are efficiently visible in the swept area. In accordance with the invention, the reflectors may be moved in a limited arc of oscillating movement at a selected angular orientation, or rotated in greater areas up to and including a 360° circle. In addition, the invention may employ one, or more than two flash tube sources with moving reflectors in a warning system to accomplish the improved results of the invention.

In FIG. 2, the flash tubes 16 and 18 are conventional gas discharge sources and are each intended to produce a high intensity pulse of light through the use of any conventional circuitry known in the art. The flashes produced by the flash tubes 16 and 18 are visible over an extended area through the use of the moving reflector system hereinafter described with greater detail. The flash rate of the flash tubes 16 and 18 is selected to be of a relatively high frequency as compared to normal flash tubes to insure that generally all observers in the area swept by the reflectors are visually exposed to the flashes during reflector movement.

Although any suitable frequency of flash may be selected in accordance with the invention, it has been found that a flash rate of 200 flashes per minute is suitable to cover the swept area, as compared to typical flash rates of 60-120 flashes per minute of conventional flash tubes. By pulsing the flash tube relatively rapidly and at random in relation to the non-synchronized moving of the reflector, an effective scattering of flashes is attained in conjunction with the broad beam width of the gas discharge source. The total optical efficiency of the technique of the invention is very high.

Figure 3:
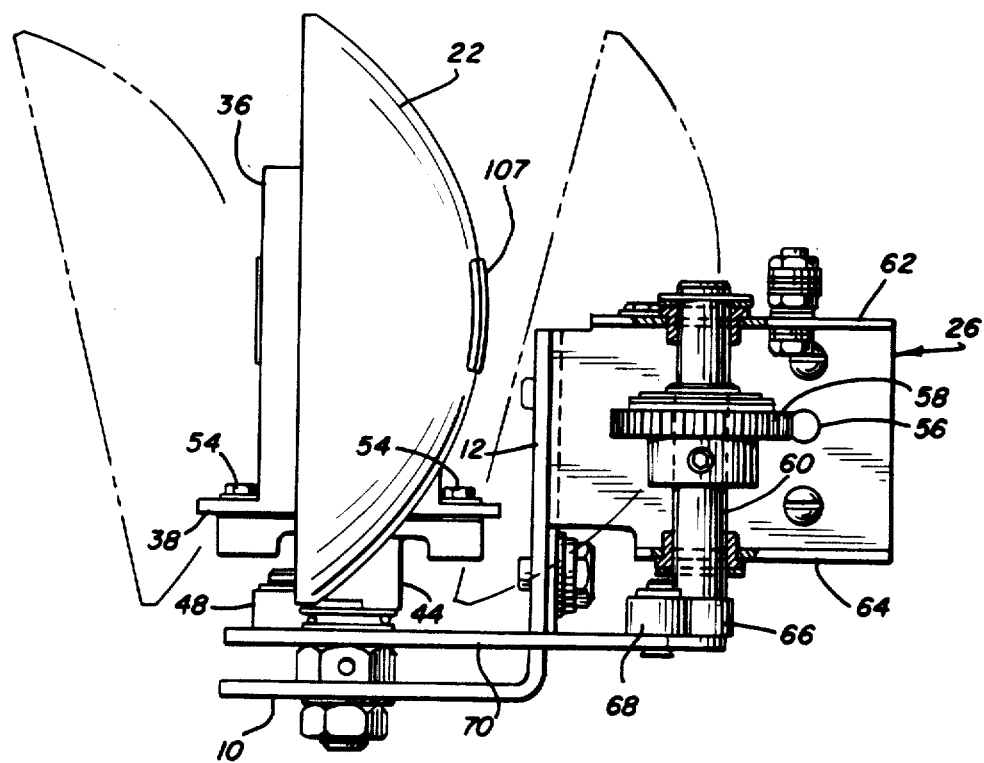
FIG. 3 is a side elevational view of the light assembly of FIG. 1, showing by dash lines different vertical positions of the light reflectors.

The particular structure of the light assembly system of FIGS. 1-3, moving the reflectors 20, 22 includes a permanent magnet motor 24 supported on a motor mounting bracket 26 which is bolted to the back plate 12 by bolts 28.

The motor 24 drives a crank assembly 30 which causes the U-shaped bracket 14 and the light sources mounted thereon to oscillate back and forth about a vertical axis. In addition, a gear assembly 32 causes each of the reflectors 20 and 22 to oscillate vertically about a horizontal axis during the foregoing oscillation about a vertical axis.

The U-shaped bracket 14 includes a pair of upright parallel plate portions 34 and 36 integral with a horizontal base portion 38. A cylindrical spacer member 35 extends between the two upright plate members 34 and 36 and is secured at its ends by screws 37. The U-shaped bracket 14 includes an aperture 40 in the base portion 38 to permit the bracket to mount over the top of a crank member 42 (see FIG. 2) including a sleeve portion 44 and a crank arm 46 having a lug 48. The sleeve 44 is mounted over a fixed shaft 50 the lower end of which is fixedly supported from the baseplate 10 by a pair of nuts 52. The base 38 of the U-shaped bracket 14 is fixed to the crank member 42 by a pair of screws 54 (see FIG. 1) which engage into lug portions integral with sleeve 44. The U-shaped bracket 14 and crank member 42 are thus secured together for conjoint rotation about the vertical axis of fixed shaft 50.

As best shown in FIG. 3, the motor 24 includes an output worm 56 which meshes with a worm gear 58 fixedly mounted on an upright shaft 60 having its upper and lower ends journalled for rotation in upper and lower horizontal plate portions 62 and 64 which form part of the motor mounting bracket 26.

The lower end of the vertical shaft 60 projects beneath the fixed plate portion 64 and has a crank fixedly mounted thereon, one end 66 of the crank being mounted on the shaft 60 and the other end 68 being secured to one end of a link 70. The other end of the link 70 is secured to lug 48 of crank member 42. In the foregoing manner, motor 24 through worm 56 drives worm gear 58 thereby rotating vertical shaft 60 and crank 66. Rotation of crank 66 about the axis of shaft 60 operates through link 70 to alternately push and pull crank arm 46 thereby oscillating crank member 42 back and forth on shaft 50 conjointly with U-shaped bracket 14.

The amount of the foregoing horizontal oscillation of U-shaped bracket 14 about the axis of shaft 50 depends upon the respective lengths of the crank 66, 68 and crank arm 46, and in the preferred embodiment being described the total horizontal oscillating motion is 30 degrees. It is preferred that in the intermediate position the reflectors 20 and 22 be directed forwardly as shown in solid lines in FIG. 1. Accordingly, in the preferred embodiment the reflectors oscillate back and forth approximately 15 degrees left and 15 degrees right of the forward position of the reflectors shown in solid lines in FIG. 1. The left and right horizontal positions of reflectors 20 and 22 are shown by the dash lines in FIG. 1. It is within the scope of the present invention to vary the amplitude of horizontal oscillation by varying the above-described crank linkage geometry.

The two lamps 16 and 18 are fixed relative to U-shaped bracket 14 and oscillate back and forth horizontally with that bracket as represented by the reflector positions illustrated in dash lines in FIG. 1.

In accordance with the preferred embodiment of the present invention, the reflectors 20 and 22 also oscillate up and down about a horizontal axis relative to the lamps 16 and 18, while the latter oscillates horizontally with the bracket 14 but do not oscillate vertically. As best shown in FIG. 2, a stub shaft 80 is crimped or otherwise fixedly supported in a horizontal position from the upright plate portion 34 so as to project inwardly therefrom, and a similar stub shaft 82 is mounted from the opposite plate portion 36. A plastic gear member 84 having an integral mounting sleeve 86 is mounted on stub shaft 80, the plastic sleeve 86 being positioned on the shaft 80 and retained thereon by a flange 88 formed on the inner end of the shaft. The sleeve 86 is loosely mounted on the shaft 80 so it is free to rotate thereon under the control of a beveled gear segment 90 formed on gear 84.

A reflector mounting bracket best shown in FIG. 1 comprises a plate portion 92 which is parallel to the gear 84 and riveted or otherwise affixed thereto, and a transverse plate portion 94 having a curved and portion 95 to which reflector 20 is riveted or otherwise affixed. It will thus be understood that oscillation of beveled gear segment 90 back and forth about the horizontal axis of stub shaft 80 will cause reflector 20 to oscillate up and down about the same horizontal axis as best shown in FIG. 3.

Vertical oscillation of the reflectors 20 and 22 is controlled by a third stationary bevel gear 108 which is fixedly mounted at the upper end of shaft 50 as shown in FIG. 2. The bevel gear 108 is plastic and has an integral sleeve 110 which mounts on the upper end of shaft 50 and is held in position by a set screw 112. The foregoing arrangement is quite advantageous as it simplifies the assembly and minimizes tolerance problems. The third gear 108 may readily be adjusted vertically so that it meshes properly with the two bevel gear segments 90 and 102.

It will now be understood that with the above-described assembly of the gear segments 90 and 102 and stationary bevel gear 108, vertical oscillation of the reflectors 20 and 22 is effected automatically during the horizontal oscillation of U-shaped bracket 14. Thus, as U-shaped bracket 14 oscillates horizontally back and forth through its 30 degree range as described above, gear segments 90 and 102 are caused to move around stationary bevel gear 108, thereby causing limited rotation of gear members 84 and 96 back and forth about the horizontal axis of stub shafts 80 and 82. Since reflectors 20 and 22 are mounted on brackets 92, 94 and 104, 106 which are affixed to the beveled plastic gears 84, 90 and 96, 102, respectively, reflectors 20 and 22 will oscillate vertically about the horizontal axis of shafts 80 and 82 as U-shaped bracket oscillates horizontally.

The gear ratio between the beveled gear segments 90 and 102 and fixed bevel gear 108 will determine the amplitude of the vertical oscillation. In the preferred embodiment described herein, the gear ratio is 2:1, meaning the diameter of the gear segments 90 and 102 is two times the diameter of the fixed bevel gear 108. Such a gear ratio produces a vertical oscillation of 15 degrees. The preferred intermediate position is that shown in solid lines in FIG. 3 so as to produce an approximately horizontal light beam, and the reflectors 20 and 22 are tilted 7½ degrees above and below that intermediate position as illustrated by the dash lines in FIG. 3. Such an amplitude of vertical oscillation can readily be increased by reducing the foregoing gear ratio, or it may be reduced by increasing the gear ratio.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A movable warning light for providing a scattering of high intensity light flashes over a desired swept area comprising, in combination, a gas discharge strobe light source for producing a plurality of high intensity light flashes at a rate in excess of 120 flashes per minute, a movable reflector mounted adjacent said light source for reflecting said light flashes, and drive means for moving said reflector to cause said reflected light flashes to sweep over a predetermined area.

2. A movable warning light as defined in claim 1 wherein said drive means oscillates said reflector back and forth over a predetermined area.

3. A movable warning light as defined in claim 2 where said oscillation is back and forth through an angle not substantially exceeding 40 degrees.

4. A movable warning light as defined in claim 1 where said reflector is moved relative to said light source.

5. A movable warning light as defined in claim 1 where said drive means oscillates said light source back and forth about a first axis conjointly with said reflector and also oscillates said reflector back and forth about a second axis relative to said light source.

6. A movable warning light as defined in claim 5 where said drive means oscillates said light source back and forth about a vertical axis conjointly with said reflector and also oscillates said reflector up and down about a horizontal axis relative to said light source.

7. A movable warning light as defined in claim 6 where the total horizontal sweep of said light source and reflector about said vertical axis is not substantially in excess of 40 degrees and the total vertical sweep of said reflector about said horizontal axis is not substantially in excess of 30 degrees.

8. A warning light as defined in claim 1 where said gas discharge strobe light is pulsed at a rate of approximately 200 flashes per minute.

9. A movable warning light for providing a scattering of high intensity light flashes over a desired swept area comprising, in combination, a pair of gas discharge strobe light sources mounted on a common movable support for producing a plurality of high intensity light flashes at a rate in excess of 120 flashes per minute, a pair of reflectors mounted on said common support, one mounted adjacent each of said light sources for reflecting said light flashes, and drive means for moving said common support and for moving said reflectors relative to said common support, said drive means oscillating said common support back and forth about a vertical axis and also ocillating said pair of reflectors up and down about a horizontal axis relative to said common support.

10. A movable warning light as defined in claim 9 where the total horizontal sweep of said common support about said vertical axis is not substantially in excess of 40 degrees and the total vertical sweep of said reflector about said horizontal axis is not substantially in excess of 30 degrees.

* * * * *